W. LAKE.
MANUFACTURE OF ARTIFICIAL STONE.
APPLICATION FILED DEC. 15, 1908.
938,248. Patented Oct. 26, 1909.
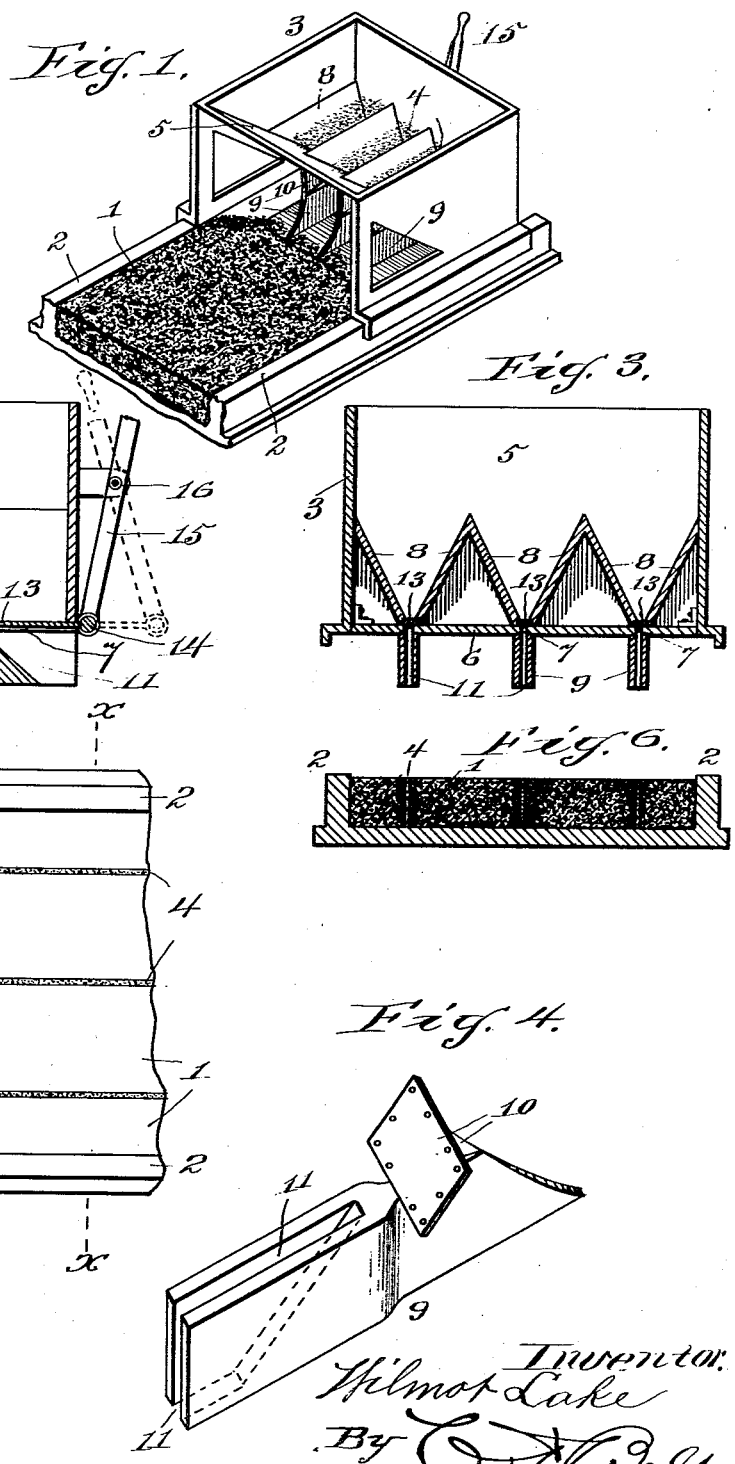

UNITED STATES PATENT OFFICE.

WILMOT LAKE, OF WASHINGTON, DISTRICT OF COLUMBIA.

MANUFACTURE OF ARTIFICIAL STONE.

938,248.

Specification of Letters Patent. Patented Oct. 26, 1909.

Application filed December 15, 1908. Serial No. 467,663.

*To all whom it may concern:*

Be it known that I, WILMOT LAKE, a citizen of the United States, residing at Washington, in the District of Columbia, have invented certain new and useful Improvements in Manufacture of Artificial Stone, of which the following is a specification.

This invention relates to the manufacture of artificial stone from cement, concrete and the like, and pertains especially to method and means for separating a body of cement or concrete into sections or independent bodies before drying or hardening.

In the practical use of cement or concrete as or in the place of stone it is obvious that to produce the same in sections, slabs and blocks is most desirable. This has been accomplished by molding each block or section separately, or by sawing or otherwise shaping the cement after it has become set, dry and hard.

The purpose of this invention is to effect a severance or separation of a body of concrete, cement or the like into sections, slabs or blocks (which has been assembled or formed for drying and setting) before drying and setting takes place, so that such whole body of cement dries and hardens into separate and independent pieces or sections capable of independent manipulation and application.

The object of the invention is to provide means for cutting through a body of cement or like substance before drying or hardening and leaving a separating medium in the furrows or paths of the cutters for separating the concrete into independent sections, bodies or blocks.

A further object of the invention is to provide a traveling sand carrier having sand discharge plows and adapted to be slid or rolled over a body of formed cement or concrete before it becomes dry or set for cutting the cement into sections and for depositing sand in the furrows of the plows preparatory to drying the cement.

A still further object of the invention is to provide novel and peculiar sand feeding plows for cutting a wet body of cement into sections so as to leave the sand between such sections during the drying of the cement.

Other objects, advantages and improved results are attainable in the practical application of the invention.

In the accompanying drawings forming part of this application: Figure 1 is a perspective view showing the application of the invention. Fig. 2 is a longitudinal sectional view of the device forming the subject of this invention. Fig. 3 is a cross section of what is shown in Fig. 2. Fig. 4 is a detail perspective view of one of the plows. Fig. 5 is an elevation showing the concrete separated. Fig. 6 is a cross section on the line *x—x*, Fig. 5.

The same reference numerals denote the same parts throughout the several views of the drawings.

For purposes of illustration a bed of wet concrete 1, is shown formed or packed between two beams forming rails 2, for a car or traveling receptacle 3, containing sand 4.

The car 3 is box-like, having closed back and sides, and an inclined front 5 terminating at its lower end in a bottom piece 6, provided with openings or sand passages 7. The interior of the box or car is separated into a series of sand compartments by walls 8, which incline from each other from their top to the bottom piece 6, and flush with the passages 7.

A series of cutters or plows 9 depend from the bottom piece 6, and have flanges 10 suitably secured to the inclined front 5. The rear end of the plows have a slot 11, which opens through the top, bottom and said end, and which forms a discharge passage for the sand from the openings 7 to the plow furrows, so that the feeding of sand to the furrows is simultaneous with the making of the furrows.

The flow of sand from the car through the plow is controlled by cut-off slides 13, preferably operated over the openings 7. There is a slide for each of said openings and they project from a bar 14 pivoted to a hand lever 15 fulcrumed at 16. Any other suitable means may be employed for effecting a slidable cut-off.

It is obvious that the car may be provided with suitable rollers or wheels for the track, and that various modifications of the mechanical construction and arrangement of parts may be made in the practical application of the invention, without departing from the spirit of the invention.

In operation—after the concrete or cement has been assembled or formed in a body, and while it is yet soft and wet, the car which is supplied with sand, is slid or rolled over the concrete or cement so that the plows cut through the cement, and at the same time deposit sand in the plow cuts or furrows where it is left during the drying out and hardening of the cement, thus separating or dividing such body of wet cement into dry sections, slabs or blocks.

It will be seen that sand is deposited by the plows into the cuts or furrows simultaneously with the making of the cuts or furrows by the plows.

Having thus described my invention what I claim as new and desire to secure by Letters Patent is:

1. The method of separating a body of wet concrete or cement into sections preparatory to making artificial stone, which consists in moving a receptacle containing sand over the said wet body, simultaneously spacing said body and filling sand into the spaces from and during such movement of the receptacle, allowing the sections to dry with the sand between them and then separating the sections and removing the sand therefrom.

2. In the manufacture of artificial stone, a sand receptacle adapted to be moved over a body of wet material prepared for such stone, and means carried by the receptacle through said body for simultaneously separating it into sections and depositing sand from the receptacle between the sections.

3. In the manufacture of artificial stone, a sand car adapted to be moved over a body of wet material from which such stone is made, such car having sand discharge openings therein, and a series of cutters or plows carried by the car through the said wet body for separating it into sections and depositing the sand between the sections simultaneously with such separation.

4. In the manufacture of artificial stone, a sand box, or receptacle adapted to be moved over a body of wet material from which such stone is made, said box having sand discharge openings in the bottom thereof, and a plurality of cutters or plows carried by the box and having sand passages therethrough and adapted to cut said wet body into sections and to deposit the sand in the cuts simultaneously with the making of such cuts for separating such sections during drying and setting.

5. In the manufacture of artificial stone, the combination, with a sand box having sand discharge openings therein, of a plurality of cutters or plows depending from the box and having sand passages therethrough leading from the said openings into the plow cuts or furrows for separating a wet body of stone material into sections before drying.

6. In the manufacture of artificial stone, the combination of a traveling sand carrier, and means depending from the carrier for separating the stone material into sections and depositing sand from the carrier between the sections during the travel of the carrier.

In witness whereof I hereunto set my hand in the presence of two witnesses.

WILMOT LAKE.

Witnesses:
J. Ross Colhoun,
Wm. E. Valk, Jr.